United States Patent
Sreshta et al.

(10) Patent No.: US 6,361,739 B1
(45) Date of Patent: Mar. 26, 2002

(54) FABRICATION PROCESS FOR HIGH DENSITY POWDER COMPOSITE HARDFACING ROD

(75) Inventors: Harold Sreshta, Houston; Eric F. Drake, Galveston, both of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/782,341

(22) Filed: Feb. 13, 2001

(51) Int. Cl.⁷ .................................................. B22F 3/02
(52) U.S. Cl. .............................................................. 419/68
(58) Field of Search ............................. 419/14, 36, 65, 419/68, 8

(56) References Cited

U.S. PATENT DOCUMENTS

| | | | |
|---|---|---|---|
| 1,757,601 A | | 5/1930 | Stoody et al. |
| 3,023,130 A | | 2/1962 | Wasserman et al. |
| 3,972,108 A | * | 8/1976 | Ericson et al. |
| 4,699,848 A | | 10/1987 | Maybon |
| 4,725,508 A | * | 2/1988 | Rangaswamy et al. ..... 428/570 |
| 4,741,974 A | * | 5/1988 | Longo et al. ............... 428/558 |
| 4,836,307 A | | 6/1989 | Keshavan et al. |
| 4,944,774 A | | 7/1990 | Keshavan et al. |
| 5,051,112 A | | 9/1991 | Keshavan et al. |
| 5,667,903 A | * | 9/1997 | Boyce ......................... 428/558 |
| 5,740,872 A | | 4/1998 | Smith |

FOREIGN PATENT DOCUMENTS

EP 0 246 596 5/1993

* cited by examiner

*Primary Examiner*—Ngoclan Mai
(74) *Attorney, Agent, or Firm*—Jeffery E. Daly

(57) ABSTRACT

The present invention is a new method for forming a high density hard facing rod. The rod is particularly suitable for hardfacing downhole tools including both fixed cutter and rolling cutter drill bits, bias pads for downhole rotary steerable systems, and stabilizers, and for other types of tools requiring strong and wear resistant hardfacings. The method includes the steps of: preparing a powder mix comprising carbide and metal powders, a fugitive binder, and other additives to render a moldable rheology; forming the powder mix into a powder core encased with a metal sheath to form a core-sheath assembly; and isostatically compacting the core-sheath assembly to densify the core to at least 65% of theoretical density and mechanically attach the sheath. The core fugitive binder along with residual volatile constituents may be thermally removed with or without vacuum, reducing, or inert environment prior to weld application of the composite rod.

37 Claims, 3 Drawing Sheets

FABRICATION PROCESS FOR HIGH DENSITY POWDER COMPOSITE HARDFACING ROD

BACKGROUND OF THE INVENTION

1. Field of the Invention

This invention relates to heat treatable hardfacings. In particular, this invention entails a molding/sheathing/compaction process for making high-density powder composite rods for weld-applied hard facing.

2. Description of the Related Art

Hard metal overlays are employed in rock drilling bits and other downhole tools as wear and deformation resistant cutting edges and faying surfaces. These comprise composite structures of hard particles in a metal matrix. Such hard metal overlays normally are formed by brazing or weld deposition of composite rod, producing a metal alloy matrix solidified from a melt containing hard particles that remain at least partially solid. Filler metals comprising composite rod containing both matrix and hard particle constituents has been in use for several decades. Early examples of hardfacing rods for welding are shown in U.S. Pat. Nos. 1,757, 601 and 3,023,130.

Hard metal overlays used on steel-toothed rolling cutter drill bits are subjected to extreme loads and prolonged scraping action. Therefore, the strongest, most wear resistant of fused hard metals are used in these cutting structures. Typically, such hard metal composites utilize sintered pellets or grains of cemented tungsten carbide/cobalt as the primary hard phase.

In addition to steel tooth rolling cutter drill bits, other types of down-hole tools also benefit from a strong wear resistant hardfacing material. For example, fixed cutter type earth boring drill bits and stabilizers often utilize welded hardsurfacing to protect gauge, blade, or watercourse surfaces. In a relatively recent development, tools made to steer drill bits during the drilling operation provide among the most demanding applications for hard facing materials.

The formulation of composite rod filler metal entails fabrication and process considerations in addition to constituency selection. Typically, a tubular construction has been employed wherein a metal sheath is formed to enclose a particulate mixture comprising hard particles phases and additives including binders and de-oxidizers. In such rod, the sheath metal combines with substrate melt, if any, to provide substantially all of the matrix phase of the final composite. The constituency of the hardmetal deposit is dependent on deposition process parameters as well as on raw material formulation.

The management of thermal inputs during weld deposition is critical to deposit soundness and performance. Insufficient substrate heating and/or insufficient filler metal superheat can cause poor bonding, porosity, and irregular deposit configuration. Excess substrate heating, and/or excess filler metal superheat, and/or prolonged molten time produces substrate dilution and hard-particle degradation. Substrate dilution reduces carbide fractions, while sintered particle degradation causes softening and matrix embrittlement.

As the carbide loading and application surface areas increase, weld temperature and time control become increasingly critical. Composite rod with more than about 60 weight % carbide fill is problematic to weld without substrate penetration and dilution, especially on large substrates. Deposition dynamics are strongly influenced by thermal transfer, melting, and flow characteristics of the composite rod.

Melting dynamics can be accelerated by incorporating metal matrix components of the composite rod as a powder rather than as a solid sheath. This approach exploits the high specific surface area of particulate material to speed up melting, while eliminating transport and mixing dynamics. However, sheath elimination also entails loss of its structural contributions to handling strength and melt progression. U.S. Pat. Nos. 4,836,307; 4,944,774; and 5,051,112 (all incorporated by reference herein for all they disclose) disclose the sintering of a powdered composite rod as a means of replacing the mechanical strength of the sheath. Such sintered pre-forms develop a strong, porous structure which acts to impede heat flow prior to melt collapse into the weld pool. As a result, some melting speed is sacrificed and melt progression becomes more difficult to control, resulting in operator-induced thickness and composition variation in the hard facing. In U.S. Pat. No. 4,699,848, a wire-reinforced powder rod is disclosed, replacing external sheath with solid metal filler at the center of the rod, the location most limited by thermal flow from external heat sources. This construction exacerbates weldability and control limitations, compared with conventional practice.

In U.S. Pat. No. 5,740,872 (incorporated by reference herein for all it discloses) a powder composite rod is disclosed with a thin metal sheath wherein the ratio of powder metal to sheath metal exceeds 2.5. The fabrication of such methylcellulose-bound powder metallurgy composite rod for weld-deposited hard surfacing as described in this patent has been conducted by extrusion and desiccation of rod cores, followed by sheath attachment using a wrapping mill. The rod core produced in this process has a void volume of about 40 vol %, relying on the binder for green handling strength. The sheath is wrapped with a simple overlap and attached to the core by a silicate adhesive that partially infiltrates the porous core, providing additional handling strength and preventing core movement within the sheath. The silicate adhesive becomes a liquid slag during weld application, that must be manipulated out of the deposit, slowing application rates and demanding greater operator skill. These silicate influences all lend to adverse deposit effects, including pellet degradation, porosity, inclusions, and reduced thickness control. Although the thin sheath extruded rod filler metal and application process provide net improvements in application productivity, quality, and in the hard facing performance as compared with conventional practice, its utility is limited by silicate adhesive effects and also by the relative brittleness of low-density methylcellulose-bound powder cores.

BRIEF SUMMARY OF THE INVENTION

The present invention is a method for forming a high-density composite rod for hard facing. The method includes the steps of: preparing a powder mix comprising carbide and metal powders, a fugitive binder, and other additives to render a moldable rheology; forming the powder mix into a powder core encased with a metal sheath to form a core-sheath assembly; and isostatically compacting the core-sheath assembly to densify the core to at least 65% of theoretical density and mechanically attach the sheath. The core fugitive binder along with residual volatile constituents may be thermally removed with or without vacuum, reducing, or inert environment prior to weld application of the composite rod.

It is contemplated that the method has application to downhole tools including both fixed cutter and rolling cutter drill bits, bias pads for downhole rotary steerable systems, stabilizers, and other tools requiring strong and wear resistant hardfacings.

DETAILED DESCRIPTION OF THE INVENTION AND THE PREFERRED EMBODIMENT

Figure 1:
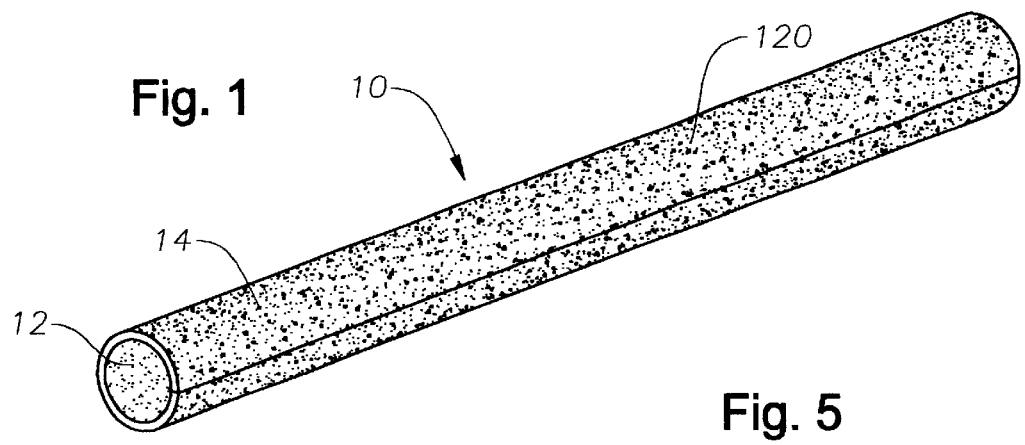
FIG. 1 is a perspective view of a high density hard facing rod made by the process of the present invention.

Referring now to FIG. 1, the high density hard facing rod 10 of the present invention has a core 12 wrapped in a steel sheath 14. The high density hard facing rod 10 is particularly suitable for hardfacings in downhole tools including earth boring drill bits 16, bias pads 18 for downhole rotary steerable systems 20, and stabilizers 22, and for other types of tools requiring strong and wear resistant hardfacings.

The high density hard facing rod 10 has an extruded or molded core 12 made of a particulate mixture comprising cemented carbide pellets, metal carbides, metal powders, and deoxidizer, with an methyl cellulose fugitive binder.

The process for making the high density hard facing rod 10 include the steps of:
 preparing a powder mix comprising carbide and metal powders, a fugitive binder, and other additives to render a moldable rheology;
 forming the powder mix into a powder core 12 encased with a metal sheath 14 to form a core-sheath assembly 110;
 and isostatically compacting the core-sheath assembly 110 densifying to at least 65% of theoretical density and mechanically attaching the sheath. The core-sheath assembly 110 is dried at dried at about 450F for between 30 minutes and 2 hours, or alternatively heated in a vacuum at 930F for between 30 minutes and 2 hours to remove the methocellulose binder.

The mixture is encased with a thin (0.001" to 0.010") steel sheath 14. This steel sheath 14 thickness range provides a weight ratio of the sheath to metallic matrix powders in the core of greater than 2.5. In the preferred embodiment, the steel sheath 14 is from 0.002" to 0.006" thick to optimize chemistry and melting characteristics.

The powder mixture consists of about 27 wt % each of 16/20 mesh sintered WC-Co pellets and 20/30 mesh crushed sintered WC/Co; about 9 wt %, 40/100 mesh monocrystalline WC; about 4 wt % 40/100 mesh cast crushed tungsten carbide; about 28 wt % 325 mesh iron powder; about 2.0 wt % silico-manganese powder and about 1.2 wt % methylcellulose binder.

The powder mixture is hydrated to a pH-adjusted moldable rheology and may be injection molded or extruded directly into a steel sheath 14 or tube to form a powder core 12, or molded or extruded into separate powder cores 12 for later encasing with a steel sheath 14. The cores 12 or core/sheath -assemblies 110 are desiccated to remove water of hydration, providing sufficient handling strength for subsequent processing.

Figure 11:
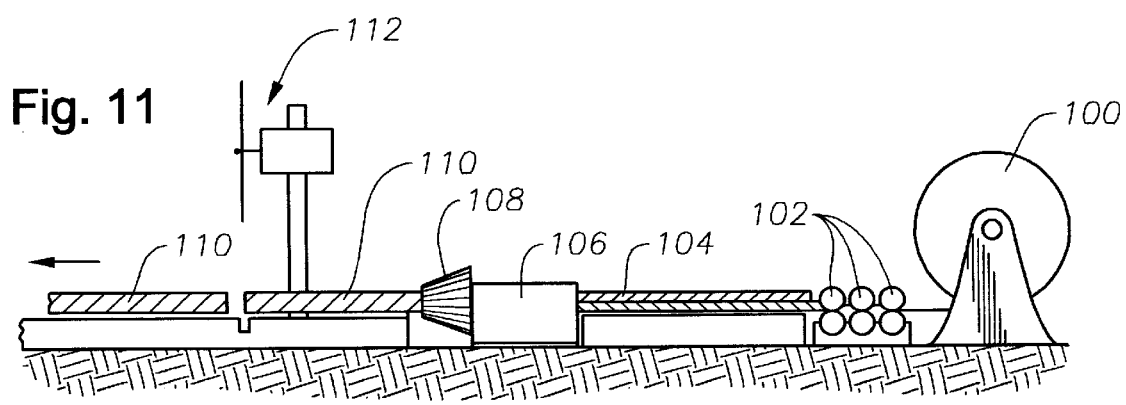
FIG. 11 is a side view of a device which encases the core-sheath assembly in a steel sheath.

A device for wrapping a steel sheath 14 about a core 10 is shown in FIG. 11. A roll of steel strip 100, is pulled into a set of rolls 102. Steel sheathing strip 100 which may be manufactured from a variety metal alloys, but preferably from low-carbon AISI 1008 steel. The rolls bend the steel strip 100 to form into a 'U' shape. A core 104 is then is placed into the 'U' shaped steel strip, or alternately, the mixture is injected into the strip. The assembly is further pulled through a folding die 106 and optionally through a reinforcing chamber (or die) 108 to form a core-sheath assembly 110. The core-sheath assembly 110 is then cut into a convenient length, typically about 28 in., by a cut-off saw 112.

Figure 9:
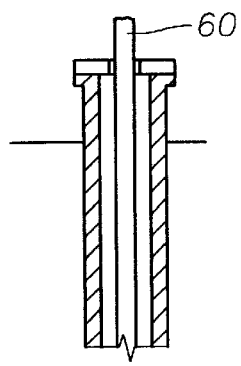
FIG. 9 is a perspective view of an elastomer container with a plurality of chambers adapted to hold the un-densified desiccated core-sheath assembly prior to compaction.
Figure 9:
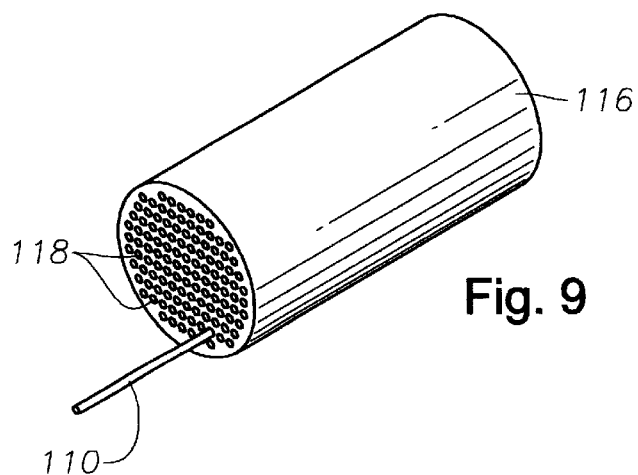
Figure 9:
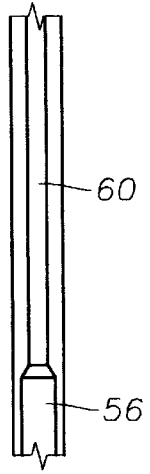
Figure 10:
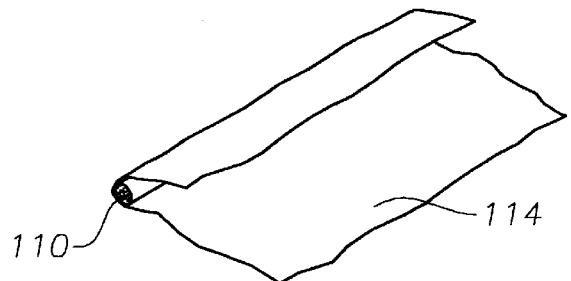
FIG. 10 is a perspective view of a sheet of elastomer material to wrap the un-densified desiccated core-sheath assembly prior to compaction.

The desiccated core-sheath assembly 110 is then prepared for compaction. Preferably, compaction of the desiccated core-sheath assembly 110 is done in a cold isostatic press. Referring now to FIGS. 9 and 10, in order to achieve sufficient densification, it is necessary to encapsulate and seal the core-sheath assemblies 110 in, for example, an elastomeric material, wrapping a sheet 114 as shown in FIG. 10 and sealing in a secondary container to encapsulate it, or preferably, encapsulating multiple core-sheath assemblies 110 in a common elastomeric multi-cavity mold 116 shown in FIG. 9.

Encapsulated core-sheath assemblies 110 are compacted within a cold isostatic press (not shown) by hydraulic compaction to a pressure between the about 30,000 psi (30 ksi) and about 50,000 psi (50 ksi)—preferably 40 ksi. The compaction cycle transforms the core-sheath assembly 110 into a high density hard facing rod 10.

After compaction, the high density hard facing rod 10 reflects a wrinkled appearance due to accommodation-buckling of the sheath as indicated by numeral 120 in FIG. 1. The high density hard facing rod 10 is then normally dried and stored for use, or it may be treated at higher temperature to remove the fugitive binder prior to application.

Void content for composite rod with 60 wt% hardmetal is typically 39 vol % before compaction, decreasing to 31 vol % after CIP-densification.

The high density hard facing rod 10 is about 13% more dense, with a tightly adherent sheath, reduced oxidation susceptibility, and increased strength and ductility. As shown in FIGS. 2–8, the high density hard facing rod 10 is designed to be applied to steel substrates, typically the surfaces of drill bits 16 and other downhole tools 56, 58, 62 by oxy-fuel welding (OFW). When oxygen-acetylene is utilized, flame temperature and reducing characteristics are established through various gas flows with a slightly oxygen reducing (excess acetylene) flame adjustment. Oxygen consumption and application rates vary directly with the surface area, with oxygen flows varying considerably.

A hardfacing layer made from the high density hard facing rod 10 exhibits well-preserved cemented tungsten carbide particles as a primary constituent, which retain 90% or more of their original hardness, with monocrystalline and cast WC/WC as secondary phases. Total deposit carbide volume fractions of about 57% are typical, with porosity volume fractions less than 1%. The fraction of the sintered tungsten carbide particles in the deposit with greater than or equal to 90% hardness retention is greater than 84% even on large substrates, and often exceeds 94%. Tungsten carbide particle distribution is uniform, allowing hardfacing optimizations via site and shape control.

Deposition rate increases of 50-100% over low-density equivalents are attributed to faster melting and the absence of silicate flux complications.

Tailoring of matrix properties by core powder additions or steel sheath alloy modifications is straightforward. These property and application advantages result from the minimization of the time that the materials spend in the high temperature, molten state between rod 10 and deposit. This is a direct advantage of using a powdered (but not sintered) core 12 with a very thin steel sheath 14, and OFW application, which does not gouge the substrate and provides well controlled deposition and cooling.

The volume percent of the cemented carbide primary particles exhibiting 90 percent or more of their original hardness is at least 85 percent. These carbide primary particles can be comprised of one or more carbides of the elements W, Mo, Cr, Ta, Nb, and V.

Figure 4:
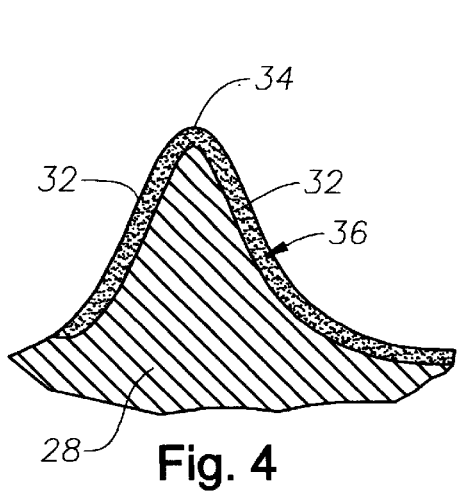
FIG. 4 is cross section view of a tooth of a rolling cutter steel tooth drill bit with a hardfacing applied with a high density hard facing rod made by the process of the present invention.
Figure 2:
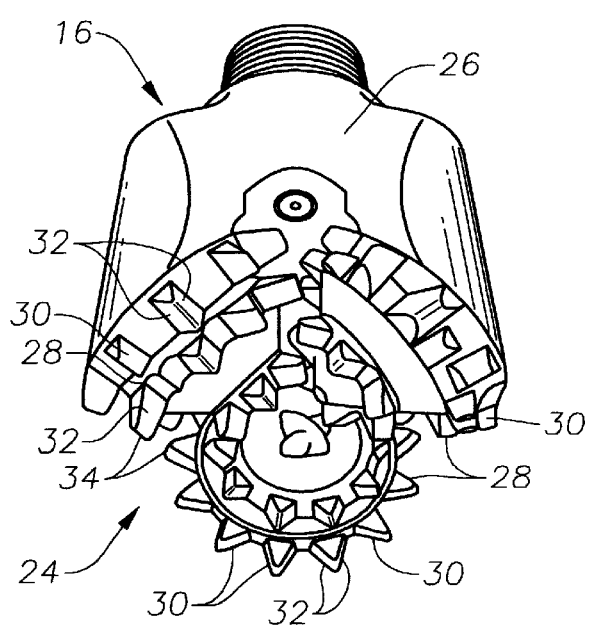
FIG. 2 is a perspective view of a rolling cutter steel tooth drill bit with hardfacing made by the process of the present invention.
Figure 3:
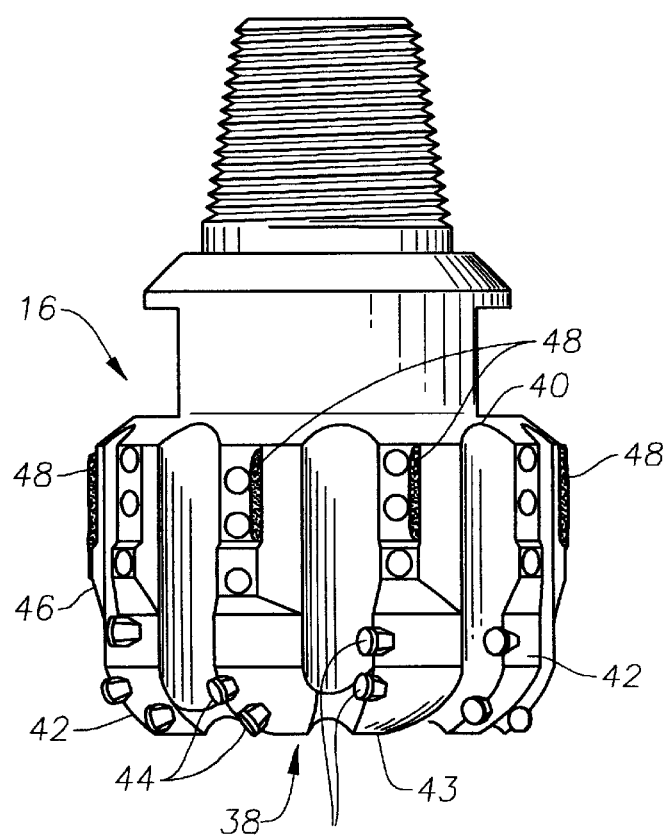
FIG. 3 is a perspective view of a fixed cutter drill bit with a hardfacing made by the process of the present invention.

Applications for the high density hard facing rod 10 are numerous. Referring now to FIGS. 2–4, one type of earth boring drill bit 16, a tooth type rolling cutter drill bit, is shown as numeral 24 in FIG. 2. Typically, tooth bits 16 have a body 26 upon which are mounted rolling cutters 28 with cutting teeth 30. In operation weight is applied to the bit, forcing the cutting teeth 30 of the cutters 28 into the earth 29, and, as the bit 24 is rotated, the earth 29 causes the cutters 28 to rotate effecting a drilling action.

The teeth 30 are generally wedge shaped with a pair of relatively flat flanks 32 and a crest 34. During drilling, the crest 34 is forced into the earth formation. By design, the rolling cutters do not allow a true rolling action of the teeth 30 when drilling. Therefore, each tooth 30 is scraped, or plowed a short distance through the earth formation as it is penetrating the earth. In order to prolong the life of the drill bit a hardfacing 36 is applied to the flanks 32 and crest 34 of the teeth 30 with the high density hard facing rod 10 of the present invention.

Another type of drill bit 16, a fixed cutter drag-type drill bit 38, is shown in FIG. 3. The fixed cutter drill bit 38 comprises a bit body 40 machined from steel and having blades 42 formed on the leading face 43 of the bit 38. Extending side-by-side along each of the blades 42 is a plurality of cutting structures, indicated at 44.

The gauge region 46 of the drill bit 38 must resist the loading and abrasion arising from constant scraping against the borehole wall 39. Therefore, there is applied to the surface 46 a hardfacing 48 with the high density hard facing rod 10 made by the process of the present invention.

Figure 5:
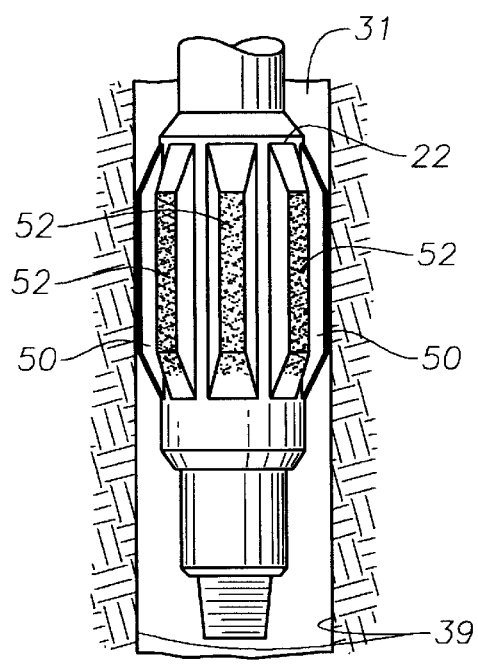
FIG. 5 is a side view of a downhole stabilizer having a hardfacing applied with a high density hard facing rod made by the process of the present invention.
Figure 6:
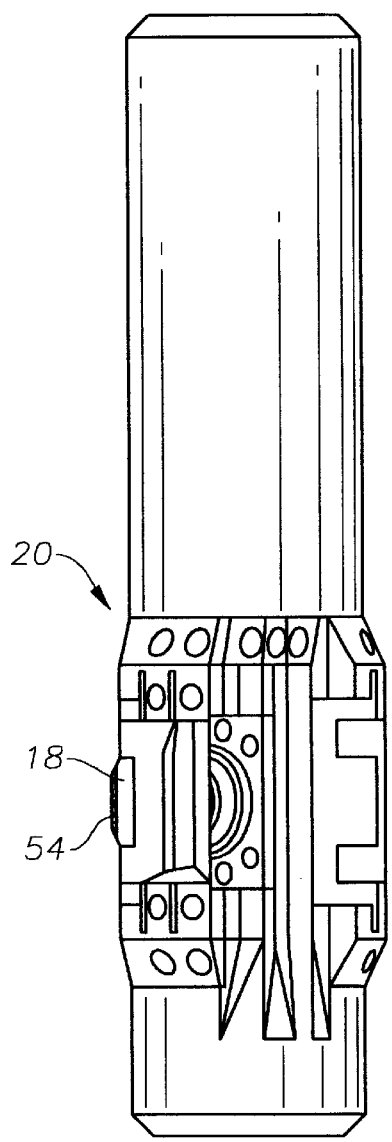
FIG. 6 is a side view of a rotary steerable tool with a bias unit having a hardfacing applied with a high density hard facing rod made by the process of the present invention.

Referring now to FIGS. 5 and 6, there are shown other down hole tools utilizing the hardfacing applied from the high density hard facing rod of the present invention. In FIG. 5, a stabilizer 22 is shown with a plurality of blades 50. Each blade 50 must be able to withstand the severe abrasion and loads it is subjected to during operation. In order to extend the life of these blades, a hardfacing material 52 is often applied. Hardfacing 52 applied by the high density hard facing rod made by the process of the present invention is suitable for this application.

Shown in FIG. 6, is a rotary steerable unit 20, with a bias pad 18. The bias pad 18 repeatedly engages the sidewall 39 of the borehole 31 in order to push the tool to one side as directed by its control system. Because these bias pads 18 repeatedly apply extreme loads to the borehole wall 39, they must be coated with, or made from a very abrasion resistant and strong material such as a hardfacing 54 and applied by the high density hardfacing rod 10 made by a process of the present invention.

Figure 7:
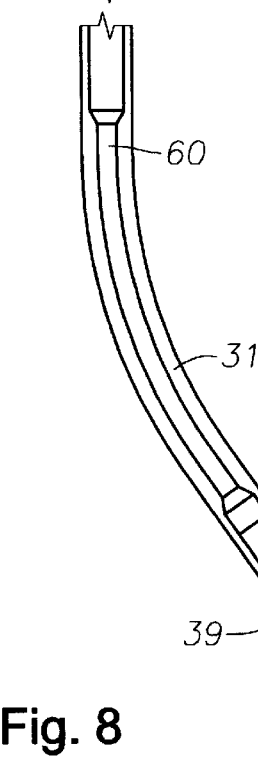
FIG. 7 is partial section view cross section view of a bottom hole assembly of a drill string with tools having hardfacing applied with a high density hard facing rod made by the process of the present invention.
Figure 8:
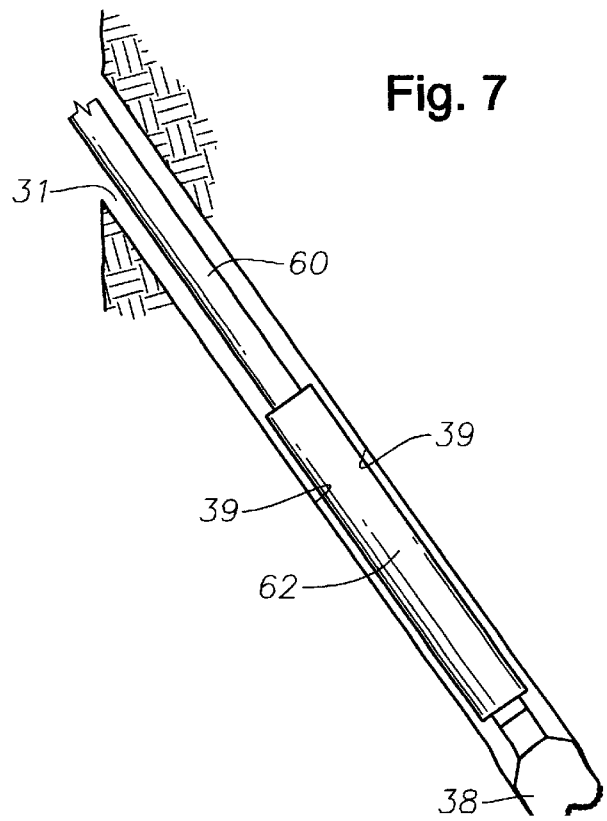
FIG. 8 is partial section view of a drill string with tools having hardfacing applied with a high density hard facing rod made by the process of the present invention.

Referring now to FIGS. 8 and 9, are shown other applications utilizing downhole tools 56, 58 having a hardfacing applied with a high density hard facing rod made process of the present invention. In FIG. 8 a number of different tools 56, 58 are shown in the drill string 60. These tools 56, 58 may include, but are not limited to, downhole motors, measuring while drilling tools, logging tools, vibration dampers, shock absorbers, and centralizers. These tools 56, 58 benefit from hardfacing applied with high density hard facing rod made by the process of the present invention. In particular, down hole bottom hole assemblies 62, as shown in FIG. 7, are often operated while gravity is pushing them against the borehole wall 39. Once again the extreme abrasion and loads applied to the size of these tools make them benefit from a high pace in applied with a high density hardfacing rod made by the process of the present invention.

Whereas the present invention has been described in particular relation to the drawings attached hereto, it should be understood that other and further modifications apart from those shown or suggested herein, may be made within the scope and spirit of the present invention.

What is claimed is:

1. A method for forming a high density hardfacing rod comprising the steps of: preparing a powder mix comprising carbide and metal powders, a fugitive binder, and other additives to render a moldable rheology;

forming the powder mix into a powder core encased with a metal sheath to form a core-sheath assembly; and isostatically compacting the core-sheath assembly to densify the core and mechanically attach the sheath.

2. The method of claim 1 further comprising the step of encapsulating the core-sheath assembly in elastomer prior to compaction.

3. The method of claim 2 wherein the core-sheath assembly is compacted in a cold isostatic press (CIP).

4. The method of claim 2 wherein the core-sheath assembly is compacted to between about 30 ksi and about 50 ksi.

5. The method of claim 1 wherein the hardmetal mixture comprises powders of refractory metal carbide, cobalt, iron and alloying materials.

6. The method of claim 1 wherein the sheath is low carbon steel.

7. The method of claim 6 wherein the steel sheath has a thickness between about 0.002" and about 0.010".

8. The method of claim 1 further comprising the step of desiccating the cores or core-sheath assemblies to remove water of hydration, providing sufficient handling strength for subsequent processing.

9. A method for forming a high density hard facing rod comprising the steps of:

preparing a powder mix comprising carbide and metal powders, a fugitive binder, and other additives to render a moldable rheology;

forming the powder mix into a powder core encased with a metal sheath to form a core-sheath assembly;

and isostatically compacting the core-sheath assembly to densify the core to at least 65% of theoretical density and mechanically attach the sheath.

10. The method of claim 9 wherein the core-sheath assembly is compacted at between about 30 ksi and about 50 ksi.

11. The method of claim 9 wherein the sheath is AISI 1008 steel.

12. The method of claim 11 wherein the steel sheath has a thickness between about 0.002" and about 0.010".

13. The method of claim 9 further comprising the step of desiccating the cores or core-sheath assemblies to remove water of hydration, providing sufficient handling strength for subsequent processing.

14. The method of claim 9 wherein the hardmetal mixture comprises powders of refractory metal carbide, cobalt, iron and alloying materials.

15. A method for forming a wear resistant surface on a rolling cutter drill bit by oxy-fuel welding a hardfacing layer on the bit with a high density hardfacing rod, the rod formed by preparing a powder mix comprising carbide and metal powders, a fugitive binder, and other additives to render a moldable rheology; forming the powder mix into a powder core encased with a metal sheath to form a core-sheath assembly; and isostatically compacting the core-sheath assembly to densify the core and mechanically attach the sheath.

16. The method of claim 15 further comprising the step of encapsulating the core-sheath assembly in elastomer prior to compaction.

17. The method of claim 16 wherein the core-sheath assembly is compacted in a cold isostatic press (CIP).

18. The method of claim 16 wherein the core-sheath assembly is compacted to between about 30 ksi and about 50 ksi.

19. The method of claim 15 wherein the hardmetal mixture comprises powders of refractory metal carbide, cobalt, iron and alloying materials.

20. The method of claim 15 wherein the sheath is AISI 1008 steel.

21. The method of claim 20 wherein the steel sheath has a thickness between about 0.002" and about 0.010".

22. The method of claim 15 further comprising the step of desiccating the cores or core-sheath assemblies to remove water of hydration, providing sufficient handling strength for subsequent processing.

23. A method for forming a wear resistant surface on a bias pad of a rotary steerable tool by oxy-fuel welding a hardfacing layer on the bias pad with a high density hardfacing rod, the rod formed by preparing a powder mix comprising carbide and metal powders, a fugitive binder, and other additives to render a moldable rheology; forming the powder mix into a powder core encased with a metal sheath to form a core-sheath assembly; and isostatically compacting the core-sheath assembly to densify the core and mechanically attach the sheath.

24. The method of claim 23 further comprising the step of encapsulating the core-sheath assembly in elastomer prior to compaction.

25. The method of claim 24 wherein the core-sheath assembly is compacted in a cold isostatic press (CIP).

26. The method of claim 24 wherein the core-sheath assembly is compacted to between about 30 ksi and about 50 ksi.

27. The method of claim 23 wherein the hardmetal mixture comprises powders of refractory metal carbide, cobalt, iron and alloying materials.

28. The method of claim 23 wherein the sheath is AISI 1008 steel.

29. The method of claim 28 wherein the steel sheath has a thickness between about 0.002" and about 0.010".

30. The method of claim 23 further comprising the step of desiccating the cores or core-sheath assemblies to remove water of hydration, providing sufficient handling strength for subsequent processing.

31. A method for forming a wear resistant surface on a downhole tool by oxy-fuel welding a hardfacing layer on the tool with a high density hardfacing rod, the rod formed by preparing a powder mix comprising carbide and metal powders, a fugitive binder, and other additives to render a moldable rheology; forming the powder mix into a powder core encased with a metal sheath to form a core-sheath assembly; and isostatically compacting the core-sheath assembly to densify the core and mechanically attach the sheath.

32. The method of claim 31 further comprising the step of encapsulating the cores-heath assembly in elastomer prior to compaction.

33. The method of claim 32 wherein the core-sheath assembly is compacted in a cold isostatic press (CIP).

34. The method of claim 32 wherein the core-sheath assembly is compacted to between about 30 ksi and about 50 ksi.

35. The method of claim 31 wherein the hardmetal mixture comprises powders of refractory metal carbide, cobalt, iron and alloying materials.

36. The method of claim 31 wherein the sheath is AISI 1008 steel.

37. The method of claim 36 wherein the steel sheath has a thickness between about 0.002" and about 0.010".

* * * * *